J. A. WILLIS.
SHIPPING RECEPTACLE.
APPLICATION FILED DEC. 10, 1914.

1,178,981.

Patented Apr. 11, 1916.
2 SHEETS—SHEET 1.

Witnesses
C. N. Woodward
W. N. Woodson

Inventor
J. A. Willis

By
H. A. N. Stacy, Attorneys.

J. A. WILLIS.
SHIPPING RECEPTACLE.
APPLICATION FILED DEC. 10, 1914.
1,178,981.
Patented Apr. 11, 1916.
2 SHEETS—SHEET 2.
Fig. 3.
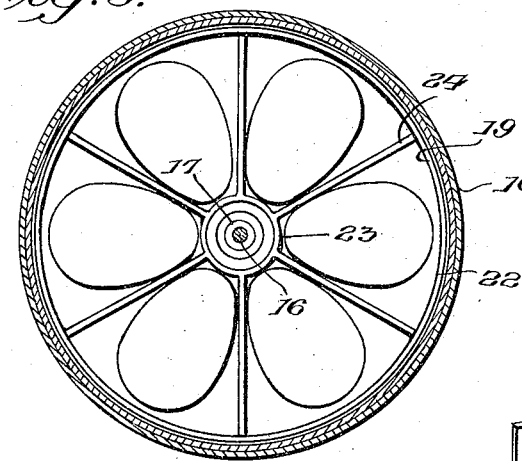
Fig. 4.
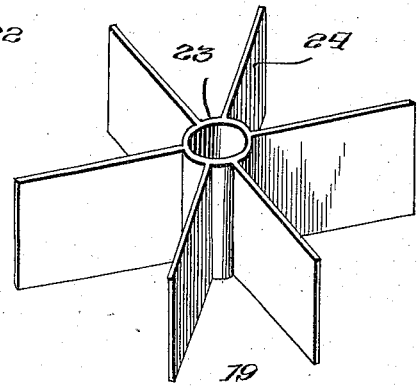
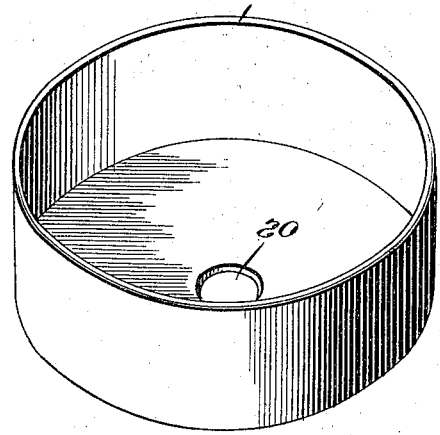
Fig. 5.
Fig. 6.
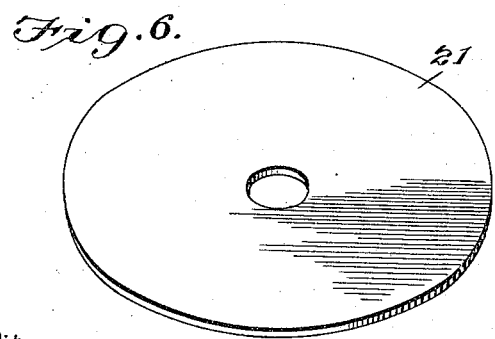
Witnesses
C. N. Woodward
W. N. Woodson
Inventor
J. A. Willis.
By ............., Attorneys.
THE COLUMBIA PLANOGRAPH CO., WASHINGTON, D. C.

UNITED STATES PATENT OFFICE.

JOHN A. WILLIS, OF HOOD RIVER, OREGON, ASSIGNOR OF ONE-HALF TO GUST WESTERBERG, OF HOOD RIVER, OREGON.

SHIPPING-RECEPTACLE.

1,178,981. Specification of Letters Patent. Patented Apr. 11, 1916.

Application filed December 10, 1914. Serial No. 876,515.

*To all whom it may concern:*

Be it known that I, JOHN A. WILLIS, a citizen of the United States, residing at Hood River, in the county of Hood River and State of Oregon, have invented certain new and useful Improvements in Shipping-Receptacles, of which the following is a specification.

This invention relates to devices for shipping articles, and designed more particularly for shipping eggs, fruits, butter and like perishable commodities or products by parcels post, and has for one of its objects to provide a simply constructed device whereby eggs and like fragile products may be shipped without danger of breaking.

Another object of the invention is to provide a simply constructed device which may be adapted without material change to shipping products or commodities of various kinds.

Another object of the invention is to provide a device wherein products or commodities of various kinds may be shipped in the same casing or receptacle without interference with each other.

Another object of the invention is to provide a device of this character having a plurality of receptacles for the articles to be shipped and arranged within a shell with the receptacle constantly spaced away from the sides and ends of the shell to protect the contents from injury.

Figure 1:
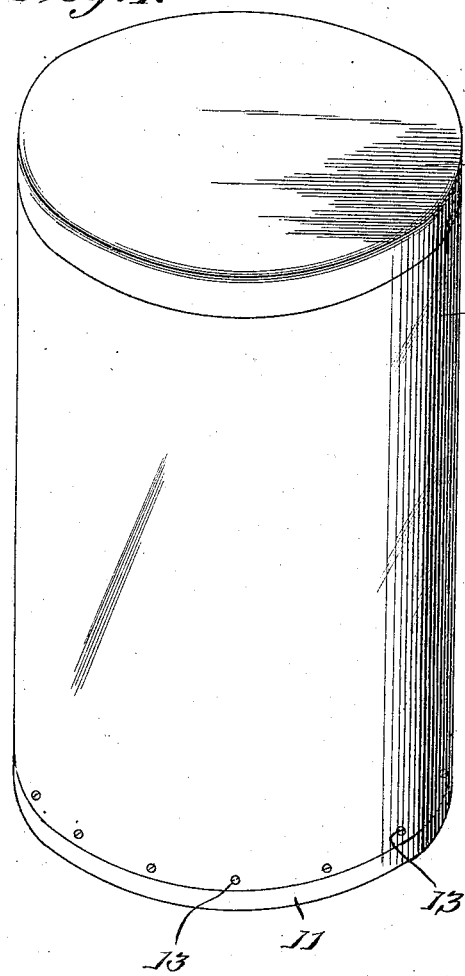
Figure 2:
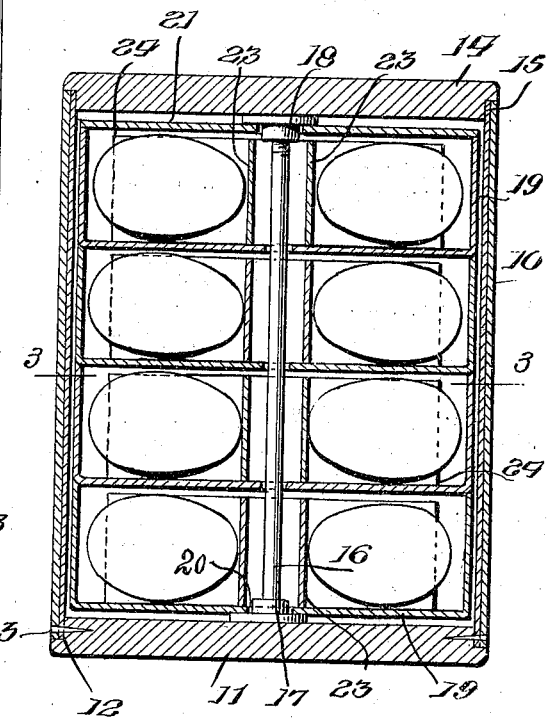

With these and other objects in view, the invention consists in certain novel features of construction as hereinafter shown and described and then specifically pointed out in the claims; and in the drawings illustrative of the preferred embodiment of the invention Figure 1 is a perspective view of the improved device; Fig. 2 is a longitudinal sectional elevation; Fig. 3 is a transverse section on the line 3—3 of Fig. 2; Fig. 4 is a detached perspective view of one form of the dividing members; Fig. 5 is a detached perspective view of one of the smaller receptacles employed in conjunction with the device shown in Fig. 4; Fig. 6 is a detached perspective view of the transverse bearing member.

Corresponding and like parts are referred to in the following description and indicated in all the views of the drawings by the same reference characters.

The improved device includes an outer shell or body, preferably cylindrical and represented as a whole at 10. The body may be constructed of any suitable material, but will preferably be of heavy card board and of one or more thicknesses as may be preferred.

The bottom member 11 of the receptacle may be of wood, as indicated, with a rabbet 12 to receive the lower end of the shell 10 and secured in place by suitable tacks or small nails indicated at 13. At its upper end the shell 10 is provided with a closure, likewise preferably of light wood, and indicated as a whole at 14 and likewise preferably provided with a rabbet 15 to receive the upper end of the shell 10. A step 17 is connected to the bottom 11, and a rod 16 rises from the step and extends through the center of the shell.

The top 14 is provided with a threaded member 18 to engage over the threaded upper end of the rod 16, the member 18 including a laterally directed spacing flange, as shown, the object to be hereafter explained. By this simple means the closure 14 may be secured in position upon the shell by simply rotating the same to cause the member 18 to engage the threaded rod within the shell, the rabbet 15 of the closure engaging the upper edge of the shell. Thus the three parts 10, 11 and 14 are firmly united, while at the same time the closure 14 may be detached by simply reversely rotating the same.

When eggs, fruit and like products are to be shipped a plurality of dish-shaped receivers or receptacles indicated at 19, will be disposed within the shell 10 one upon the other, as shown in Fig. 2, each of the members 19 having an opening 20 in its bottom through which the rod 16 passes. By thus arranging the dish shaped receivers the bottom of the second dish-shaped receiver forms the top of the lower dish-shaped receiver, while the bottom of the third dish-shaped receiver forms the top of the second dish-shaped receiver and so on throughout the series. The upper dish-shaper receiver 19 is provided with a top or upper member 21, which likewise serves as a bearing member.

As shown in Fig. 2, the vertical side of the dish shaped receivers are spaced from the side walls of the shell. The bottom of the lower dish shaped receiver bears upon the spacing flange of the step 17, while the upper bearing member 21 bears beneath the lateral flange of the member 18. By this means when the top 14 is rotated to cause its rabbet 15 to engage the upper edge of the shell, the various dish-shaped receivers, together with the top 21, will be compressed into close relations and all rattling and looseness obviated, while at the same time the dish shaped receivers are held spaced away from the bottom 11 and top 14 and also from the side walls of the shell.

One of the dividing members, represented in Fig. 4, is disposed in each of the dish-shaped receivers 19, as indicated in Fig. 2, thus dividing the dish-shaped receivers into a plurality of radial compartments to receive the eggs, indicated at 22, or fruit, or other products or commodities. The dividing members comprise a central cylindrical core 23, and radial plates or wings 24, the members 23—24 being preferably formed integral and of soft paper. Each individual egg or other article is thus maintained in separated condition and all danger of breakage obviated. If preferred a packing of saw dust, cotton or the like may be disposed around the eggs and between the wings 24.

The improved device is simple in construction, can be inexpensively manufactured of any suitable material, but as before stated, the shell and the dish-shaped receivers and the dividing members are preferably of paper or like material.

The improved device can be constructed as large as the postal laws will permit.

Having thus described the invention, what is claimed as new is:—

1. In a shipping receptacle, a plurality of receivers, each including a bottom having a central opening and integral vertical sides and adapted to be superimposed within an inclosing shell, a division member for each of said receivers and including a tubular core registering with the bottom opening of the receiver and having a plurality of wings radiating therefrom and extending to the vertical sides of the receiver, and a holding member extending through the openings of the receiver and through the cores of the division members.

2. In a shipping receptacle, a receiver including a bottom having a central opening and integral vertical sides and a division member including a central tubular core registering with the bottom opening of the receiver, and radiating wings, the wings extending between the core and the vertical rim of the receiver, and a holding member extending through the openings of the receiver and through the cores of the division members.

In testimony whereof I affix my signature in presence of two witnesses.

JOHN A. WILLIS. [L. S.]

Witnesses:
S. S. TURNBULL,
A. W. ONTHANK.

Copies of this patent may be obtained for five cents each, by addressing the "Commissioner of Patents, Washington, D. C."